(12) United States Patent
Patel et al.

(10) Patent No.: US 11,643,211 B2
(45) Date of Patent: May 9, 2023

(54) ERGONOMICALLY IMPROVED OVERHEAD BIN SYSTEMS

(71) Applicant: THE BOEING COMPANY, Chicago, IL (US)

(72) Inventors: Amar Patel, Waraseoni (IN); Amruthesh Shivashankar, Chikmagalur (IN); Vinay Siddalingappa, Bangalore (IN); Ganeshprasad Kalavar, Bangalore (IN); Rejo Jayaraj, Bangalore (IN); Tom Thomas, Bengaluru (IN); Premananda Kanthi, Bangalore (IN)

(73) Assignee: THE BOEING COMPANY, Chicago, IL (US)

( * ) Notice: Subject to any disclaimer, the term of this patent is extended or adjusted under 35 U.S.C. 154(b) by 1226 days.

(21) Appl. No.: 16/148,666

(22) Filed: Oct. 1, 2018

(65) Prior Publication Data
US 2020/0102077 A1 Apr. 2, 2020

(51) Int. Cl.
*B64D 11/00* (2006.01)
(52) U.S. Cl.
CPC .................. *B64D 11/003* (2013.01)
(58) Field of Classification Search
CPC ................................................. B64D 11/003
See application file for complete search history.

(56) References Cited

U.S. PATENT DOCUMENTS

| 5,456,529 | A * | 10/1995 | Cheung | B64D 11/003 74/89.21 |
| 6,899,299 | B2 | 5/2005 | Ritts | |
| 8,038,098 | B2 | 10/2011 | Johnson et al. | |
| 9,630,718 | B2 | 4/2017 | Scown et al. | |
| 2012/0318917 | A1* | 12/2012 | Schneider | B64D 11/003 244/118.5 |
| 2016/0229537 | A1* | 8/2016 | Scown | B65D 90/54 |

FOREIGN PATENT DOCUMENTS

| DE | 9305133 U1 | 6/1993 |
| EP | 2537752 A1 | 12/2012 |
| WO | 9518040 A1 | 7/1995 |

OTHER PUBLICATIONS

Extended European search report for corresponding EP Application No. 19200867.0 dated Feb. 28, 2020 (8 pgs).

* cited by examiner

*Primary Examiner* — Nicholas McFall
(74) *Attorney, Agent, or Firm* — The Small Patent Law Group LLC; Joseph M. Butscher

(57) ABSTRACT

A storage bin assembly includes a fixed bin portion, an articulating bin portion, and an articulation system. The fixed bin portion is configured to be mounted to an aircraft, and has a cavity configured for storage of luggage. The articulating bin portion is coupled to the fixed bin portion, and includes a shelf configured for supporting luggage. The articulation system movably couples the articulating bin portion to the fixed bin portion. The articulating bin portion is movable from a first position in which the articulating bin portion is proximate to the fixed bin portion to a second position at which the articulating bin portion is separated from the fixed bin portion and lower than the fixed bin portion.

12 Claims, 8 Drawing Sheets

ERGONOMICALLY IMPROVED OVERHEAD BIN SYSTEMS

FIELD OF EMBODIMENTS OF THE DISCLOSURE

Embodiments of the present disclosure generally relate to storage bins, such as overhead bins for use in passenger compartments of aircraft.

BACKGROUND OF THE DISCLOSURE

Aircraft may include overhead bins for passenger baggage. The overhead bins may be mounted on sides and/or the center of a fuselage, depending on the type of aircraft. The height of conventional overhead bins may be relatively high, resulting in difficulties in lifting the baggage overhead for placement in the bins.

SUMMARY OF THE DISCLOSURE

A need exists for improved access and operation of storage bin assemblies.

With those needs in mind, certain embodiments of the present disclosure provide a storage bin assembly that includes a fixed bin portion, an articulating bin portion, and an articulation system. The fixed bin portion is configured to be mounted to an aircraft, and has a cavity configured for storage of luggage. The articulating bin portion is coupled to the fixed bin portion, and includes a shelf configured for supporting luggage. The articulation system movably couples the articulating bin portion to the fixed bin portion. The articulating bin portion is movable from a first position in which the articulating bin portion is proximate to the fixed bin portion to a second position at which the articulating bin portion is separated from the fixed bin portion and lower than the fixed bin portion.

Certain embodiments of the present disclosure provide a storage bin assembly that includes a fixed bin portion, an articulating bin portion, and an articulation system. The fixed bin is portion configured to be mounted to an aircraft, and has a cavity configured for storage of luggage. The fixed bin portion includes a fixed base configured to support the articulating bin portion when the articulating bin portion is in a first position. The articulating bin portion is coupled to the fixed bin portion, and includes a shelf configured for supporting luggage. The articulating bin portion includes an articulating base that is configured to be disposed above the fixed base when the articulating bin portion is in the first position. The articulation system movably couples the articulating bin portion to the fixed bin portion. The articulating bin portion is movable from a first position in which the articulating bin portion is proximate to the fixed bin portion to a second position at which the articulating bin portion is separated from the fixed bin portion and lower than the fixed bin portion. The articulation system includes links coupled to each other such that the articulating bin portion moves downward and laterally away from the fixed bin portion when moving from the first position to the second position.

Certain embodiments of the present disclosure provide a storage bin assembly that includes a fixed bin portion, an articulating bin portion, and an articulation system. The fixed bin portion is configured to be mounted to an aircraft, and has a cavity configured for storage of luggage. The fixed bin portion defines an upper volume. The articulating bin portion is coupled to the fixed bin portion, and includes a shelf configured for supporting luggage. The articulating bin portion defines a lower volume. The articulation system movably couples the articulating bin portion to the fixed bin portion. The articulating bin portion is movable from a first position in which the articulating bin portion is proximate to the fixed bin portion to a second position at which the articulating bin portion is separated from the fixed bin portion and lower than the fixed bin portion. The upper volume and lower volume cooperate to form a closed volume in the first position. The articulating bin portion moving downward from the fixed bin portion when moving from the first position to the second position.

BRIEF DESCRIPTION OF THE DRAWINGS

FIG. 11 is a block diagram of aircraft production and service methodology.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments of the present disclosure provide overhead bins having an articulating portion that articulates downward for improved ease of loading. In some embodiments, the articulating portion also articulates laterally. Once loaded with luggage, the articulating portion may be returned to a closed position in which the luggage is safely secured during a flight.

Various embodiments of the present disclosure provide for improved safety of occupants while reaching to load or unload overhead bins. Various embodiments provide improved comfort and safety of users, including people who have difficulty lifting luggage to conventional overhead bins.

Figure 1:
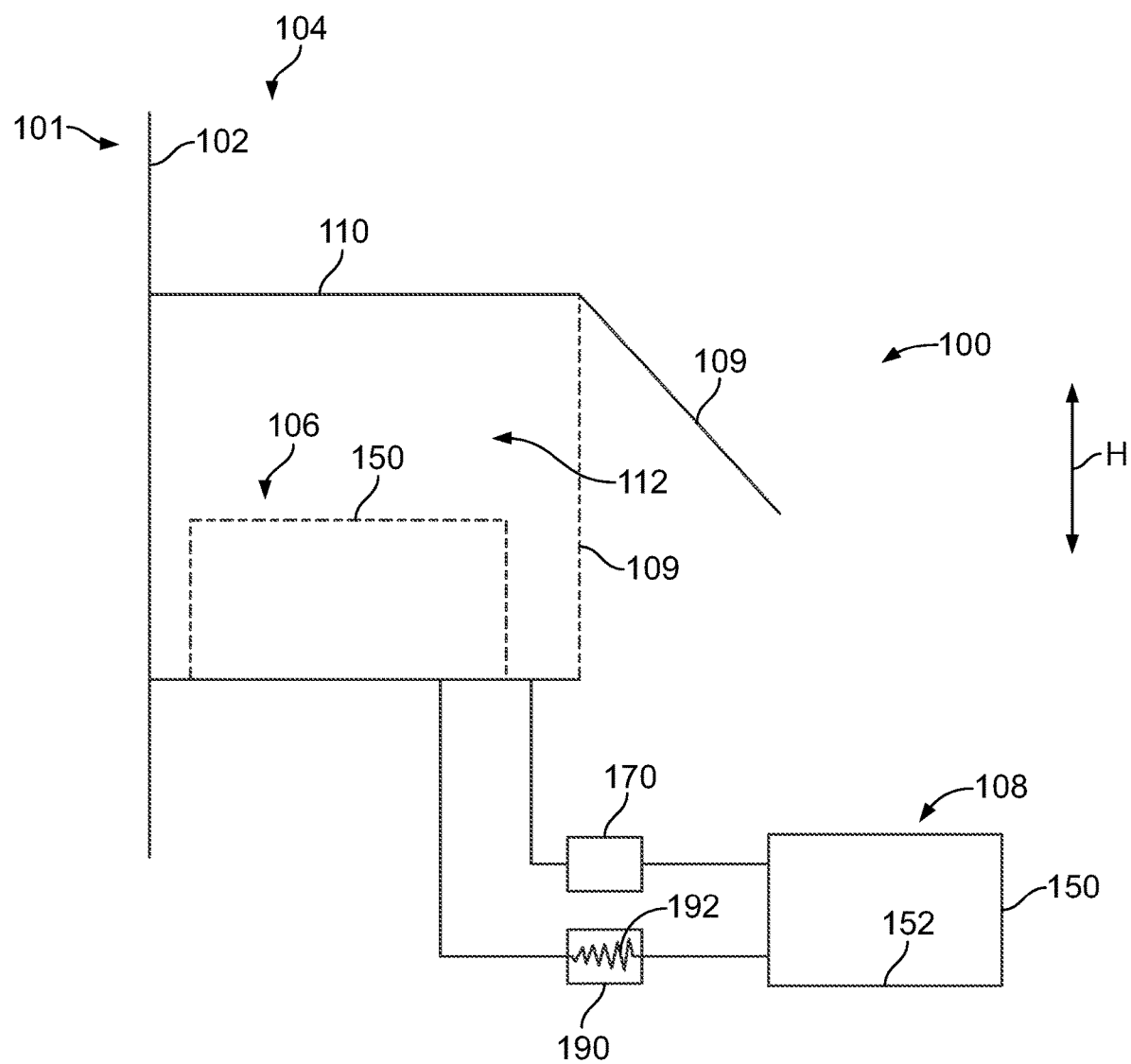
FIG. 1 provides a schematic block view of a storage bin assembly, according to an embodiment of the present disclosure.

FIG. 1 provides a schematic block diagram of a storage bin assembly 100 in accordance with various embodiments. The storage bin assembly 100 may be used in connection with a vehicle, such as an aircraft, in various embodiments. In the illustrated examples, the storage bin assembly 100 is configured for use in a passenger compartment 104 of an aircraft 101. For example, the storage bin assembly 100 may be mounted or otherwise fixed to an interior wall 102 of the passenger compartment 104. As schematically depicted in FIG. 1, the example embodiment includes a fixed bin portion 110, an articulating bin portion 150, and an articulation system 170. Generally, the fixed bin portion 110 and the articulating bin portion 150 cooperate to provide a compartment (e.g., for luggage storage). The fixed bin portion 110 and the articulating bin portion 150 are coupled by the articulation system 170, which is configured to guide the articulating bin portion 150 between closed (storage) and open (for access) positions. It may be noted that the blocks of FIG. 1 are intended to illustrate general relationships between the various components, and any physical relationships depicted or implied by FIG. 1 are not intended to be limiting. For example, the articulating bin portion 150 and fixed bin portion 110 are depicted at distance from each other in solid lines. However, when in a closed position (see, e.g., FIGS. 2 and 7), the articulating bin portion 150 and fixed bin portion 110 may be positioned adjacent and in contact (or near contact) with each other, or, as another example, the articulating bin portion 150 may be disposed within the fixed bin portion 150 in the closed position (as indicated by the phantom lines of FIG. 1).

The depicted fixed bin portion 110 is configured to be mounted to the aircraft 101. For example, the fixed bin portion 110 in various embodiments is mounted to the interior wall 102 of the passenger compartment 104. The fixed bin portion 110 has a cavity 112 configured for storage of luggage. It may be noted that the total luggage storage area for the storage bin assembly 100 may be entirely within the cavity 112, or, as another example, the cavity 112 may cooperate with an additional cavity or volume (e.g., a volume or cavity provided by the articulating bin portion 150) to define the total available luggage storage area. For example, in the example embodiment depicted in FIGS. 2 and 3 below, the entire luggage storage volume when in the closed or storage position is contained within the cavity 112, with the articulating bin portion 150 disposed within the cavity 112 in the closed or storage position. The example embodiment depicted in FIGS. 9 and 10 below provides an example of the fixed bin portion 110 and the articulating bin portion 150 cooperating to define a luggage storage volume, with the fixed bin portion 110 and the articulating bin portion 150 brought into or near contact with each other to define the luggage storage area in the closed or storage position.

The articulating bin portion 150 is coupled to the fixed bin portion 110 (e.g., via the articulation system 170), and movable between an open or access position and a closed or storage position with respect to the fixed bin portion 110. The articulating bin portion 150 includes a shelf 152 configured to support luggage or other items. For example, with the articulating bin portion 150 in the access position, luggage may be placed on the shelf 152. The luggage remains on the shelf 152 while the articulating bin portion 150 is moved from the access position to the storage position.

The articulation system 170 movably couples the articulating bin portion 150 to the fixed bin portion 110. In various embodiments, the articulation system 170 includes linkages and associated hardware such as pins for coupling the components of the linkages together. The articulation system 170 is configured to provide a desired path of movement between the open and closed positions (e.g., the links of a linkage are sized, positioned, and coupled together to provide the desired path of movement between the closed and open positions). Guided and/or supported by the articulation system 170, the articulating bin portion 150 is movable from a first position 106 (or storage or closed position, shown in phantom in FIG. 1) to a second position 108 (or access or open position). In various embodiments, the movement of the articulation system 170 may be performed entirely manually. In other embodiments, however, various articulation systems 170 may include or have associated therewith automated translation systems (e.g., motors or drives), or assist mechanisms or devices (e.g., spring).

In the first position 106, the articulating bin portion 150 is proximate to the fixed bin portion. For example, in the first position 106, the articulating bin portion 150 may be in physical contact with, immediately adjacent or in close proximity to (e.g., within an assembly or design tolerance of being in contact, or within a distance sufficiently small to prevent the passage of luggage), and/or disposed partially or entirely within the fixed bin portion 110. In the second position 108, the articulating bin portion 150 is separated from the fixed bin portion 110 and lower than the fixed bin portion 110. For example, in the second position 108, the articulating bin portion 150 may be entirely outside of the fixed bin portion 110, and/or separated from the fixed bin portion 110 by a substantial distance (e.g., the shelf 152 may be a foot or more from fixed bin portion 110, and/or at a sufficient distance to allow the passage of luggage to and from the articulating bin portion 150). In the second position 108, the articulating bin portion 150 is lower than the fixed bin portion 110. For example, as shown in FIG. 1, in the second position 108 the shelf 152 of the articulating bin portion 150 is at a lower elevation along direction H than a surface of the fixed bin portion 110 configured to support or be at substantially the same elevation as the shelf 152 in the first position 106. In some embodiments, the shelf 152 of the articulating bin portion 150 is at a lower elevation along direction H than any portion of the fixed bin portion 110 in the second position 108. The lower position of the shelf 152 in the second position 108.

In the storage position (first position 106 of FIG. 1), the luggage is secured within the storage bin assembly 100 up and out of the way of passengers, and safely secured during a trip (e.g., flight). In the access position (second position 108 of FIG. 1), the shelf 152 is at a lower elevation than it is in the closed position, thereby providing improved, convenient access, eliminating or reducing awkward or difficult reaches to the fixed bin portion 110 that is located at a higher elevation along the interior wall 102 of the passenger compartment 104.

In some embodiments, a door may be provided to help secure luggage within the storage bin assembly 100 in the closed position. For example, the illustrated example storage bin assembly 100 of FIG. 1 includes a door 109. The door 109 is coupled to the fixed bin portion 110 and movable from an open position to a closed position. The articulating bin portion 150 may be moved from the first position 106 to the second position 108 (or from the second position 108 to the first position 106) when the door 109 is in the open position (solid line in FIG. 1), but not when the door 109 is in the closed position (phantom line in FIG. 1).

As also seen in FIG. 1, the storage bin assembly 100 includes a biasing member 190. The biasing member 190 is interposed between the fixed bin portion 110 and the articulating bin portion 150. For example, one end of the biasing member 190 may be coupled to the fixed bin portion 110 and the opposite end coupled to the articulating bin portion 150. The biasing member 190 is configured to urge the articulating bin portion 150 toward the first (or closed) position 106. Accordingly the biasing member 190 reduces the effort needed to lift the articulating bin portion 150 upward against the force of gravity (as well as the effort needed to lift heavy items that may be placed on the shelf 152 of the articulating bin portion 150), and/or helps secure the storage bin assembly 100 in a closed position. In some embodiments, the biasing member 190 includes a spring 192. More than one spring 192 may be employed in various embodiments.

In some embodiments one or more sensors may be utilized, for example in connection with operating automated motion assist devices and/or with providing an indication of a position of the storage bin assembly. For example, a proximity sensor and/or force or torque sensors may be employed. The sensor(s) may be mounted to the articulating bin portion 150, fixed bin portion 110, and/or mounted to or associated with linkages forming the articulation system 170, as examples.

Figure 2:
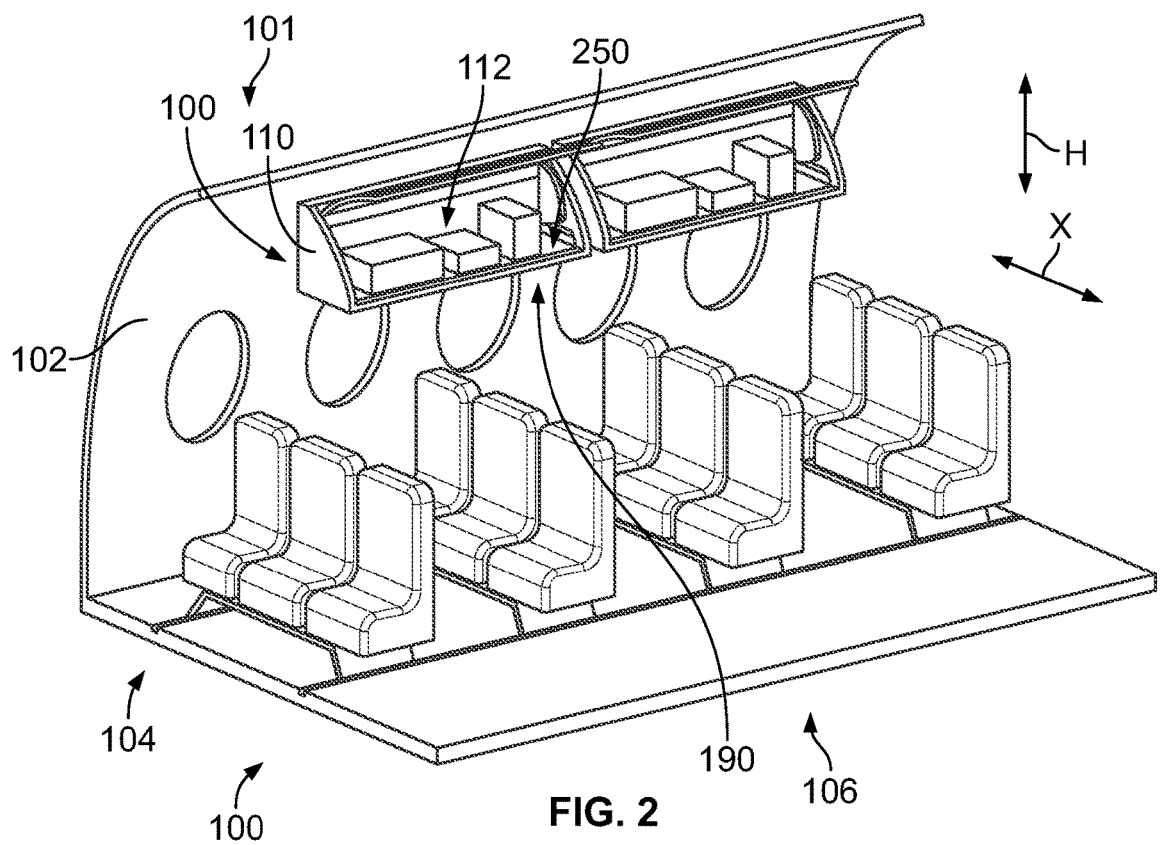
FIG. 2 provides a perspective view of a storage bin assembly in a first (or storage) position, according to an embodiment of the present disclosure.
Figure 3:
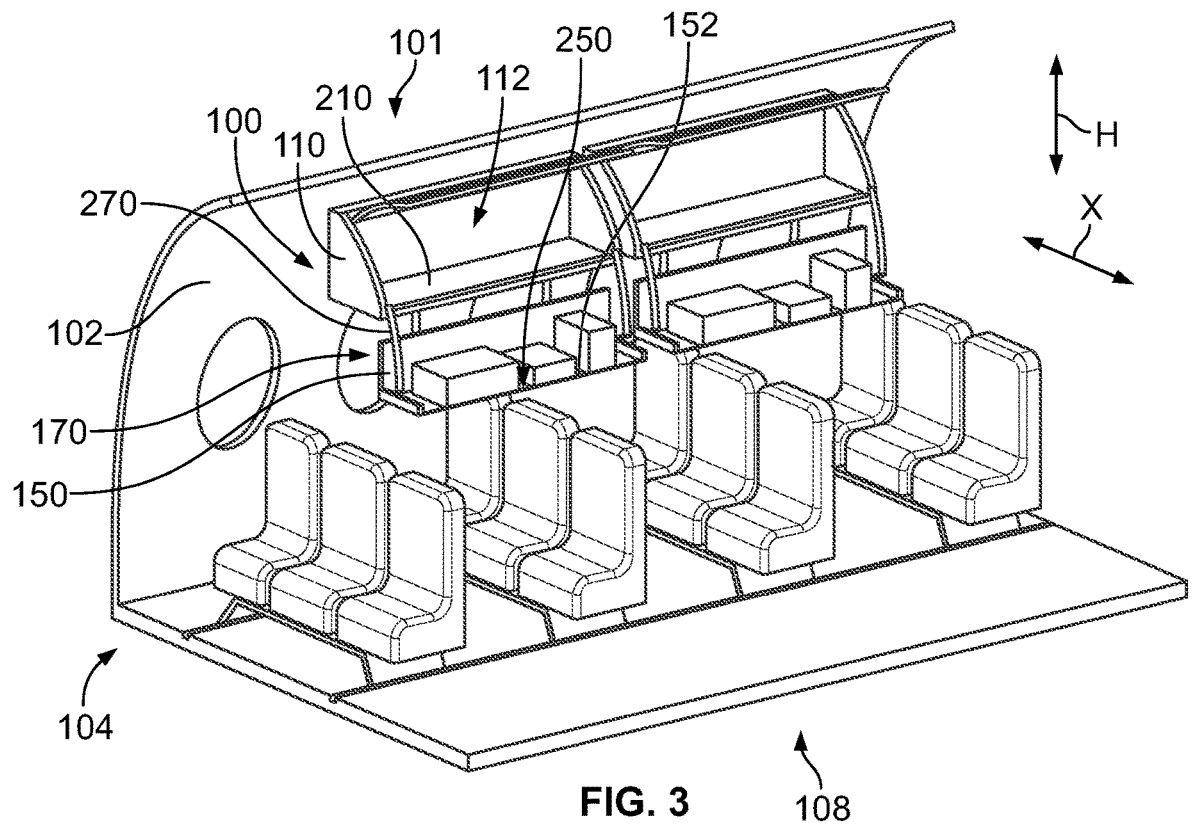
FIG. 3 provides a perspective view of the storage bin assembly of FIG. 2 in a second (or luggage access) position.

As discussed above, in some embodiments, the entire luggage storage volume when in the closed or storage position is contained within the cavity 112, with the articulating bin portion 150 disposed within the cavity 112 in the closed or storage position (or first position 106), and removed from the cavity 112 in the open or access position (or second position 108). For example, FIG. 2 provides a perspective view of such an example of the storage bin assembly 100 in a closed position, and FIG. 3 provides a perspective view of the example of FIG. 2 in an open position. As best seen in FIG. 3, the fixed bin portion 110 includes a fixed base 210. The fixed base 210 is configured to support the articulating bin portion 150 when the articulating bin portion 150 is in the first position 106 (e.g., disposed within the fixed bin portion 110 and disposed above or resting on the fixed base 210).

As seen in FIGS. 2 and 3, the articulating bin portion 150 includes an articulating base 250 that is configured to be disposed above the fixed base 210 when the articulating bin portion 150 is in the first position 106 (closed position), and below the fixed base 210 when the articulating bin portion 150 is in the second position 108 (open position). The articulating base 250 may be configured with the shelf 152 forming a portion of the articulating base 250 (e.g., an upper surface of the articulating base 250).

As best seen in FIG. 3, the depicted articulation system 170 includes links 270. The links 270 are coupled to each other (e.g., via pins) such that the articulating bin portion 150 moves downward (along direction H) and laterally away (along direction X) from the fixed bin portion 110 when moving from the first position 106 to the second position 108. Such a movement helps further reduce a reach needed to place items on the shelf 152 when in the second position 108.

Figure 4:
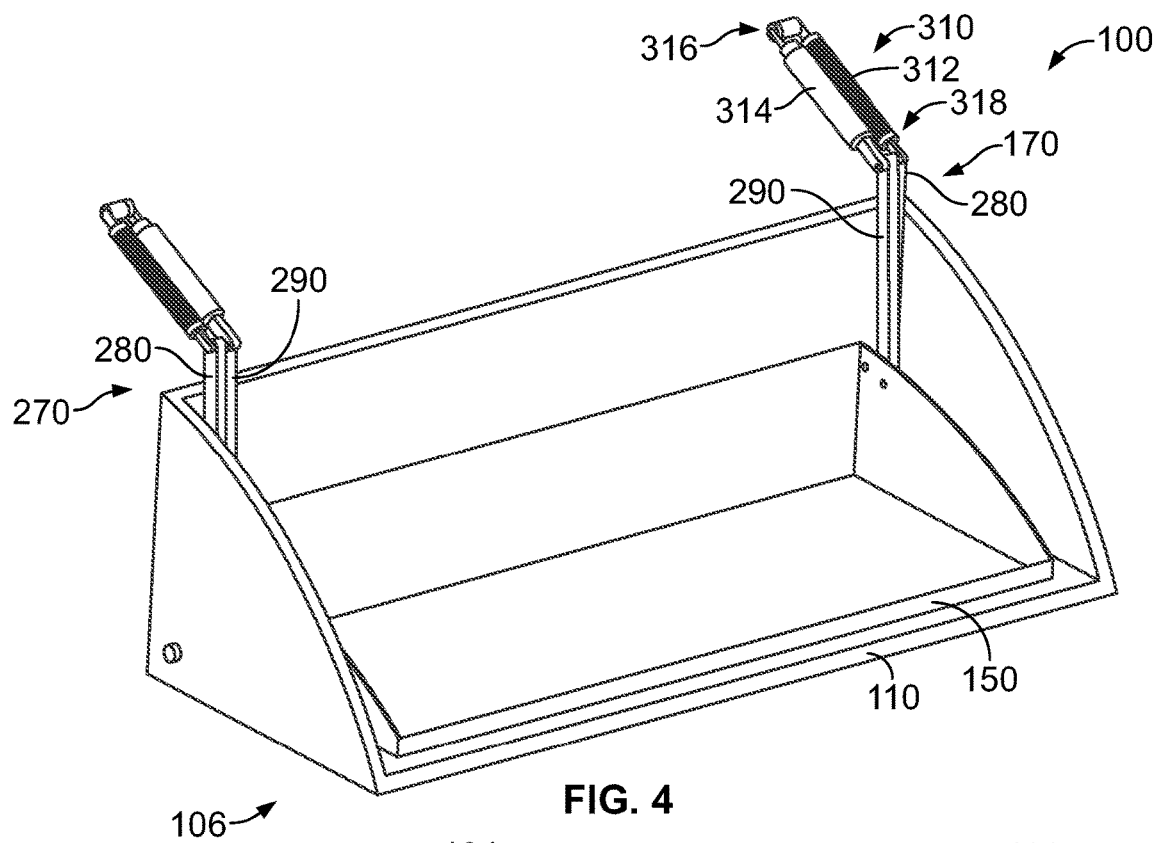
FIG. 4 provides a perspective view of the storage bin assembly of FIGS. 2 and 3 in a closed or storage position.
Figure 5:
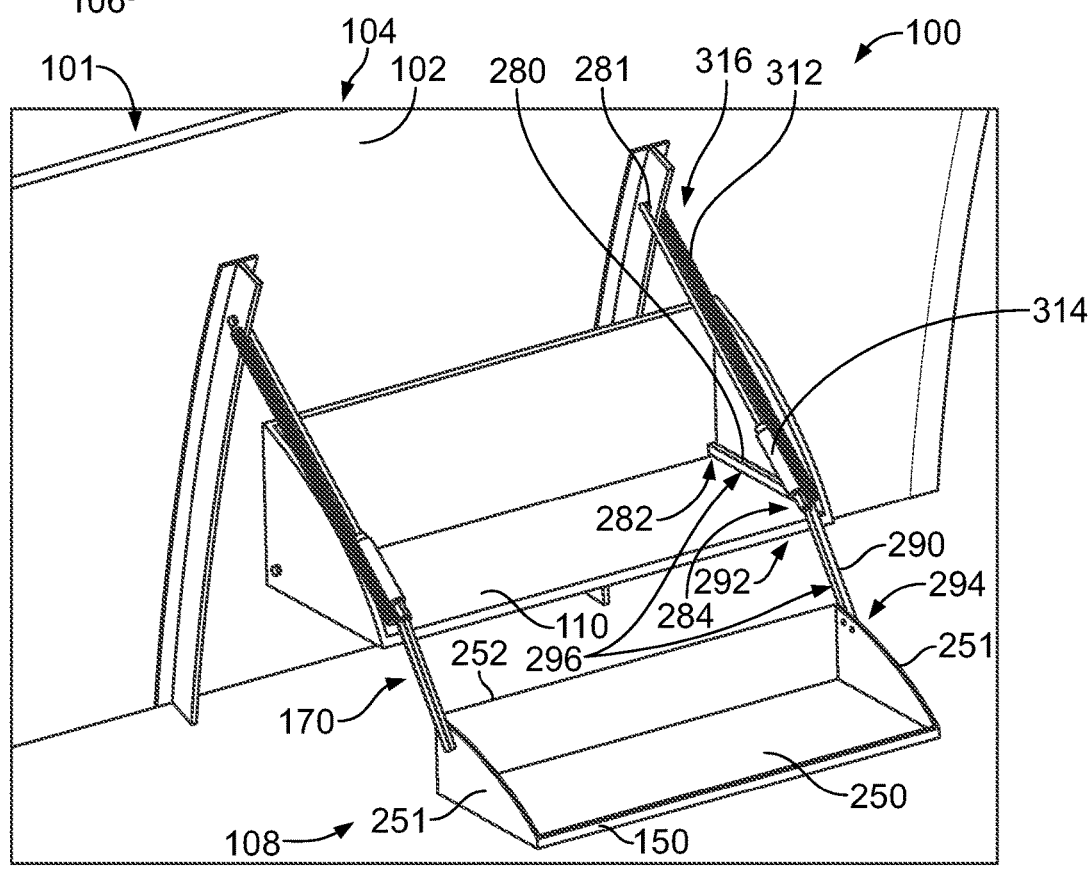
FIG. 5 provides a perspective view of the storage bin assembly of FIGS. 2 and 3 in an open position.

FIG. 4 provides a perspective view of the storage bin assembly 100 of FIGS. 2 and 3 in a closed or storage position, and FIG. 5 provides a perspective view of the storage bin assembly of FIGS. 2 and 3 in an open position.

As seen in FIGS. 3 and 4, the links 270 include a first link 280 and a second link 290. As best seen in FIG. 5, the first link 280 includes a first end 282 and a second end 284 on opposite ends of the first link 280. Similarly, the second link 290 includes a first end 292 and a second end 294 on opposite ends of the second link 290.

The first end 282 of the first link 280 is pivotally coupled (e.g., via a pin) to the fixed bin portion 110. For example, the fixed bin portion 110, as best seen in FIG. 5, includes sides 211 and back 212 extending from the fixed base 210 to define the cavity 112. The first end 282 of the first link 280 may be coupled to the fixed bin portion 110 along a hinge axis 215 extending proximate the junction of the fixed base 210 and the back 212 from one side 211 to the opposite side 211. The second end 284 of the first link 280 is pivotally coupled to the second link 290.

The first end 292 of the second link 290 is pivotally coupled (e.g., via a pin) to the second end 284 of the first link 280. Also, the second end 294 of the second link 290 is pivotally couple (e.g., via a pin) to the articulating bin portion 150. In the embodiment illustrated in FIGS. 4 and 5, the articulating bin portion includes sides 251 and back 252 extending upward from the articulating base 250. The second end 294 of the second link 290 is coupled to the articulating bin portion 150 near an upper end of the junction of the back 252 with a side 251.

The first link 280 and the second link 290 define an included angle 296 (as seen in FIG. 5), measured between the first link 280 and the second link 290 at the coupling of the second end 284 of the first link 280 and the first end 292 of the second link 290. The included angle 296 is smaller for the first position 106 (FIG. 4, where the included angle is near zero and not shown) than for the second position 108 (FIG. 5, where the included angle is between 90 and 180 degrees, for example). Generally, the first link 180 and the second link 290 approach parallel and overlap for convenient storage in the first position 106, and extend to guide the articulating bin portion 150 to a desired position for convenient loading of luggage in the second position 108. In the illustrated embodiment, two generally similar sets of links are provided on each side of the storage bin assembly 100.

The example storage bin assembly 100 depicted in FIGS. 4 and 5 also includes a spring and damper assembly 310. The spring and damper assembly 310 includes a spring 312 and a damper 314. The spring and damper assembly 310 has a first end 316 and a second end 318. The first end 316 is configured to couple to a fixed location (e.g., mounting hole 281 disposed on interior wall 102 as seen in FIG. 5). The second end 318 is pivotally coupled to the second end 284 of the first link 280 and the first end 292 of the second link 290. The spring and damper assembly 310 helps provide smooth travel of the articulating bin portion 150, and helps urge the articulating bin portion toward the first position 106, reducing the effort required to lift the articulating bin portion 150.

Figure 6:
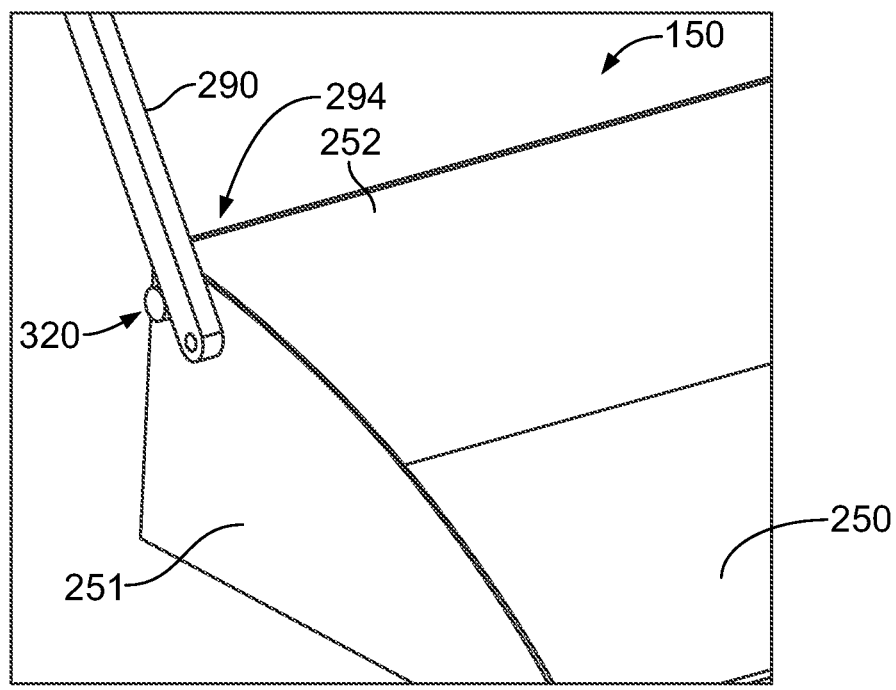
FIG. 6 provides an enlarged view of aspects of the storage bin assembly 100 of FIGS. 2 and 3.

FIG. 6 provides an enlarged view of aspects of the storage bin assembly 100 of FIGS. 2 and 3. As seen in FIG. 6, the storage bin assembly 100 includes a stop pin 320 disposed on the articulating bin portion 150. The stop pin 320 is configured to inhibit rotation of the articulating bin portion 150 with respect to the second link 290. In the illustrated embodiment, the stop pin 320 is mounted near the mounting point of the second link 290 to the articulating bin portion 150. As the articulating bin portion 150 moves in the second position, the second link 290 rotates about the pivotal coupling of the second end 294 of the second link 290 with the articulating bin portion 150, with the second link 290 eventually contacting the stop pin 320. The particular location of the stop pin 320 may be tailored for a particular application. For example, the stop pin 320 may be positioned to stop rotation of the second link 290 when the articulating base 250 is at a horizontal position.

Figure 7:
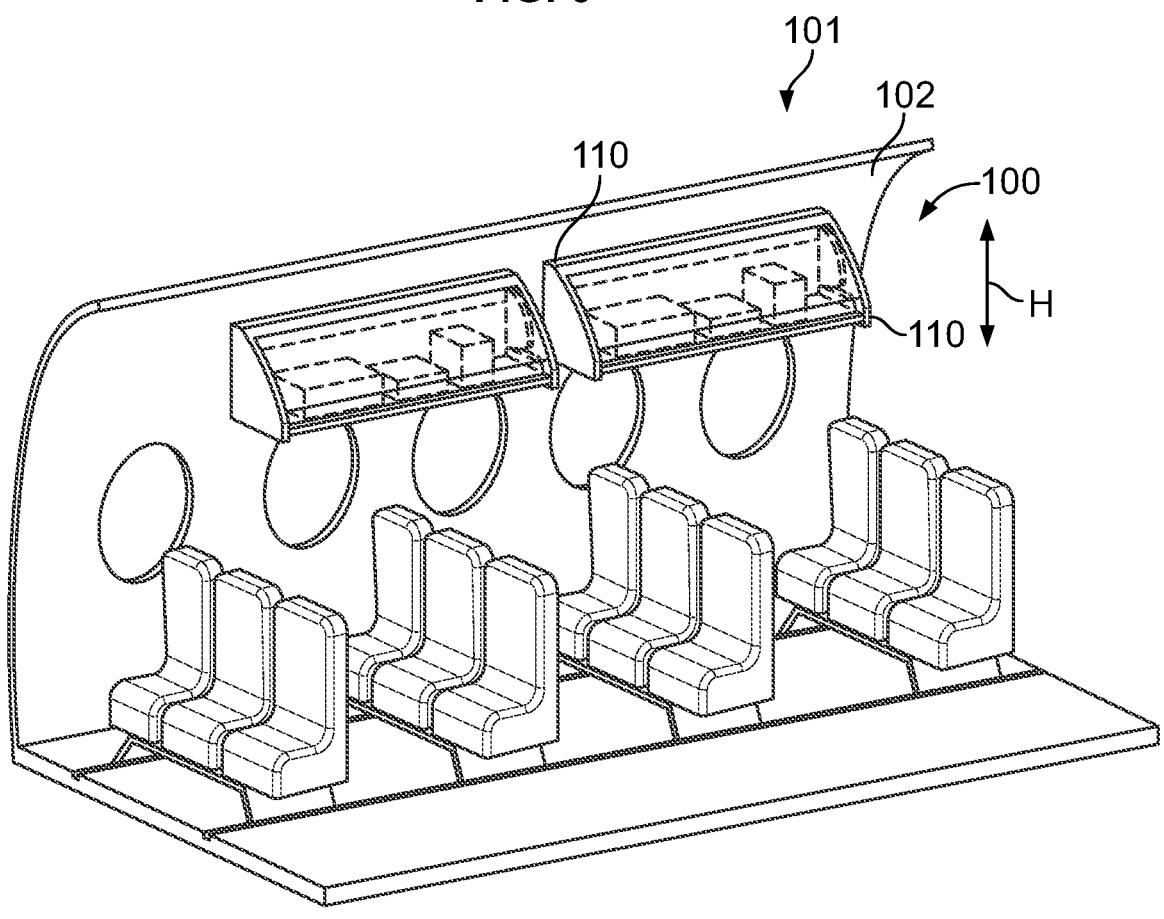
FIG. 7 provides a perspective view of a storage bin assembly in a first (or storage) position, according to an embodiment of the present disclosure.
Figure 8:
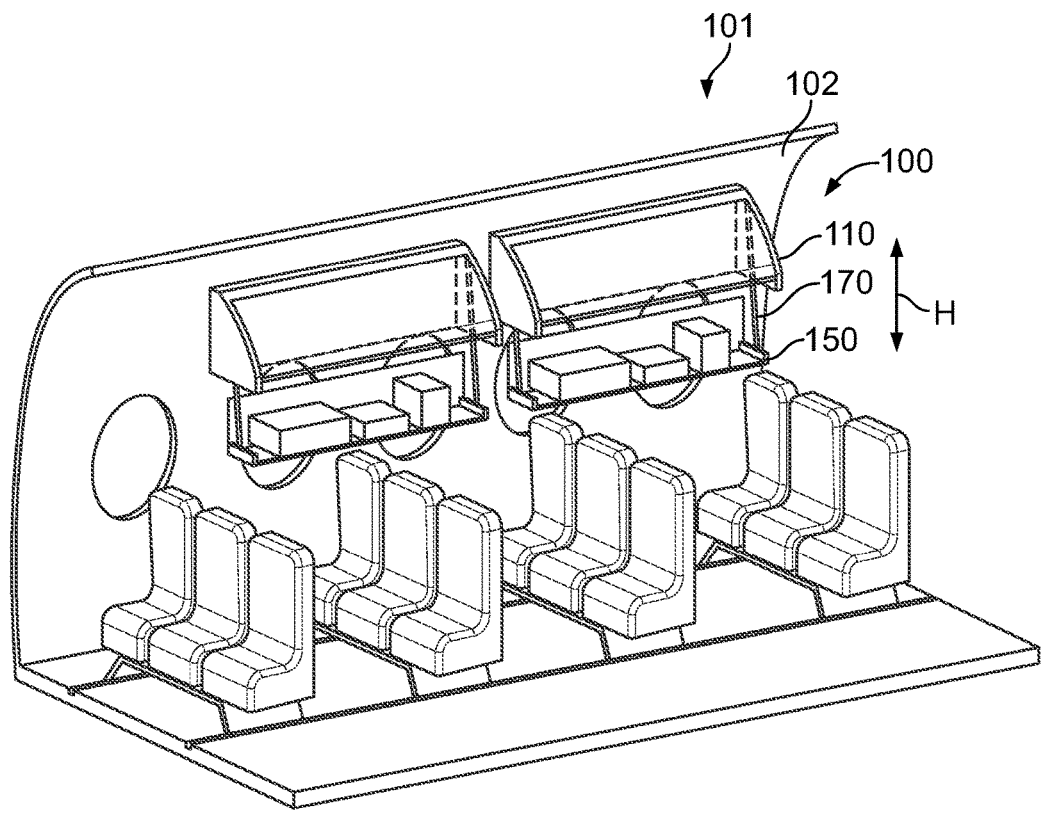
FIG. 8 provides a perspective view of the storage bin assembly of FIG. 2 in a second (or luggage access) position.

FIG. 7 depicts a perspective view of an example storage bin assembly 100 in the closed position, in which the articulating bin portion 150 moves generally vertically (along direction H) between the closed and open positions. FIG. 8 depicts a perspective view of the example of FIG. 7 in the open position. In the example of FIGS. 7 and 8, the articulating bin portion 150 moves downward from the fixed bin portion 110 when moving from the first position 106 to the second position 108. In various embodiments, the articulating bin portion 150 may move substantially only in the vertical direction (e.g., within 5 degrees of an angle defined by the elevation direction H in FIGS. 7-10).

Figure 9:
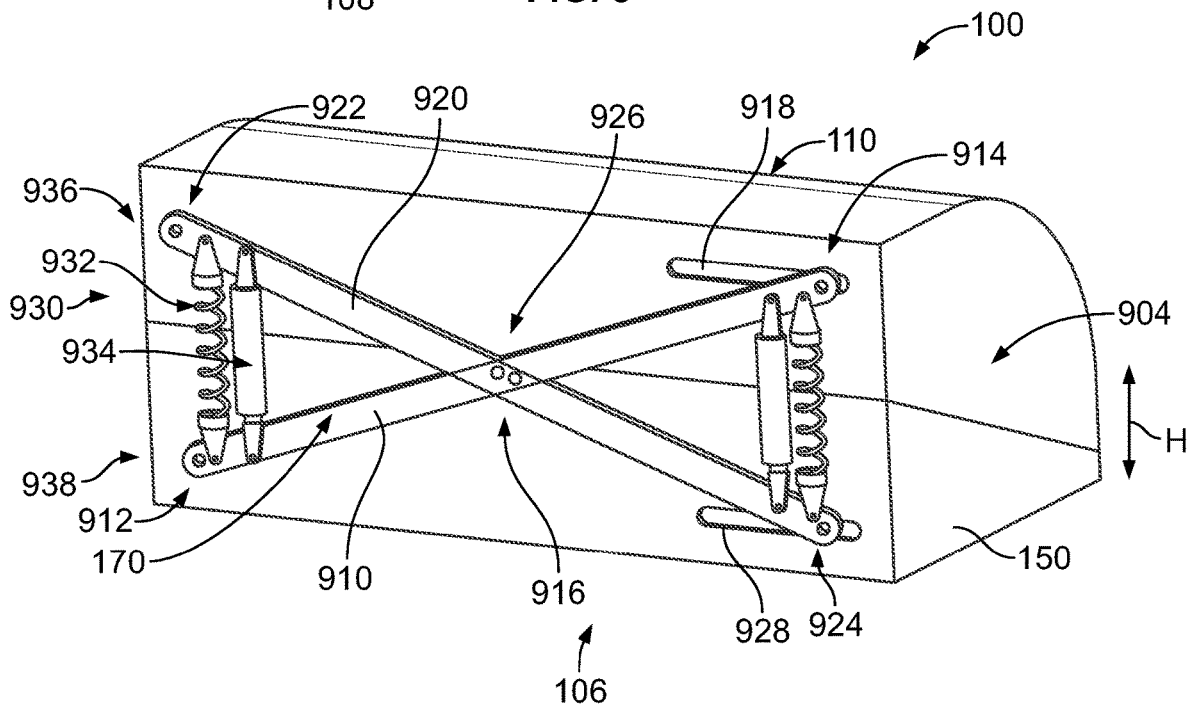
FIG. 9 provides a rear perspective view of the storage bin assembly of FIGS. 7 and 8 in a closed or storage position.
Figure 10:
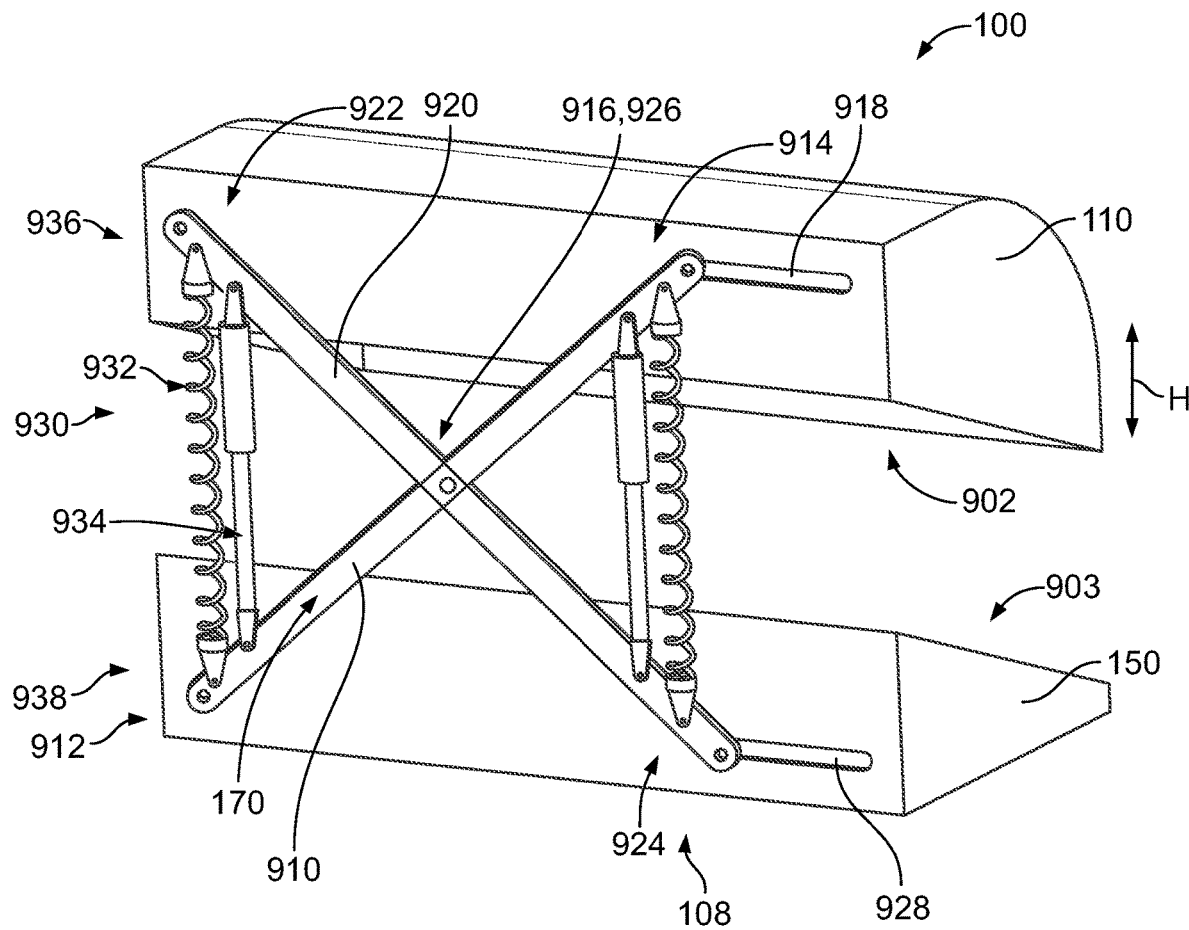
FIG. 10 provides a rear perspective view of the storage bin assembly of FIGS. 7 and 8 in an open position.

FIG. 9 provides a rear perspective view of the storage bin assembly 100 similar in respects to the storage bin assembly 100 of FIGS. 7 and 8 in a closed or storage position, and FIG. 10 provides a rear perspective view of the storage bin assembly 100 of FIG. 9 in an open position. It may be noted that in the example of FIGS. 7 and 8 as well as the example of FIGS. 9 and 10, the articulating bin portion 150 moves generally only along the elevation direction (H). However, the articulating bin portion 150 is entirely drawn into the fixed bin portion 110 in the example of FIGS. 7 and 8, and is not entirely drawn into the fixed bin portion 110 in the example of FIGS. 9 and 10, instead being drawing into contact (or nearly into contact) and cooperating with the fixed bin portion 110 to define the volume of the storage bin assembly 100 in the closed position.

The fixed bin portion 110 of the example depicted in FIGS. 9 and 10 defines an upper volume 902. The articulating bin portion 150 of the depicted example defines a lower volume 903, and the upper volume 902 and the lower volume 903 cooperate to form a closed volume 904 in the first position 106 (or closed position). Further, in the illustrated example, the articulating bin portion 150 moves downward from the fixed bin portion 110 when moving from the first position 106 to the second position 108.

Further, the articulation system 170 of the example depicted in FIGS. 9 and 10 includes a first link 910 and a second link 920. A first end 912 of the first link 910 is coupled to the articulating bin portion 150, and a first end 922 of the second link 920 is coupled to the fixed bin portion 110. Also, a second end 914 of the first link 910 is coupled to the fixed bin portion 110, and a second end 924 of the second link 920 is coupled to the articulating bin portion 150. Further, the first link 910 has an intermediate point 916 and the second link 920 has an intermediate point 926, with the first link 910 and the second link 920 pivotally connected at their respective intermediate points 916, 926. As seen in FIGS. 9 and 10, the first link 910 and the second link 920 are arranged in a cross-shape.

In some embodiments, slides or guides are used in connection with pivotal couplings to help guide the articulating bin portion 150 over a desired path (e.g., substantially vertically along direction H). For example, in the example depicted in FIGS. 9 and 10, the first end 912 of the first link 910 is pivotally coupled to the articulating bin portion 150, and the first end 922 of the second link 920 is pivotally coupled to the fixed bin portion 110. The second end 914 of the first link 910 is slidably coupled to the fixed bin portion 110 (e.g., via a pin slidably accepted by first guide 918), and the second end 924 of the second link 920 is slidably coupled to the articulating bin portion 150 (e.g., via a pin slidably accepted by second guide 928). The first guide 918 and the second guide 928 extend horizontally, or perpendicular to the elevation direction H or direction of travel. The use of such pivoting and sliding relationships between the links and the bin portions helps provide for travel limited to the elevation direction and helps reduce the possibility of cocking, jamming, or misalignment.

The example storage bin assembly 100 depicted in FIGS. 9 and 10 also includes a spring and damper assembly 930. The spring and damper assembly 930 includes a spring 932 and a damper 934. The spring and damper assembly 930 has a first end 936 and a second end 938. The first end 936 is configured to couple to the fixed bin portion 110, and the second end 938 is configured to couple to the articulating bin portion 110, with the spring and damper assembly 930 extending along the direction of travel H between the first position 106 and the second position 108. The spring and damper assembly 930 helps provide smooth travel of the articulating bin portion 150, and helps urge the articulating bin portion toward the first position 106, reducing the effort required to lift the articulating bin portion 150.

Figure 11:
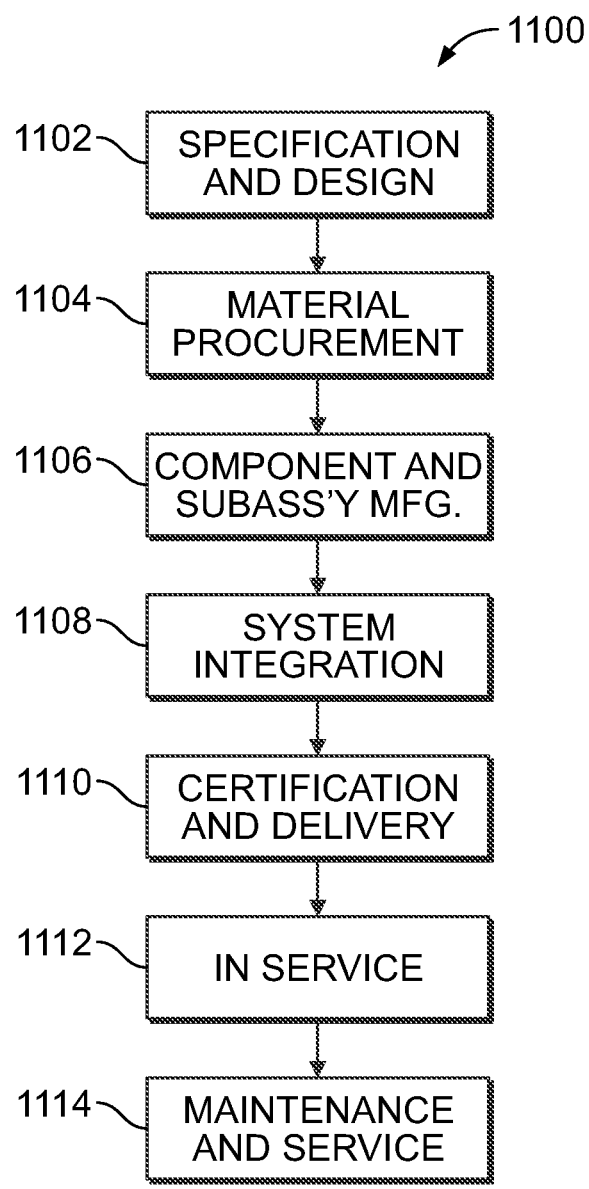
FIG. 11 illustrates a flow chart of a method, according to an embodiment of the present disclosure.
Figure 12:
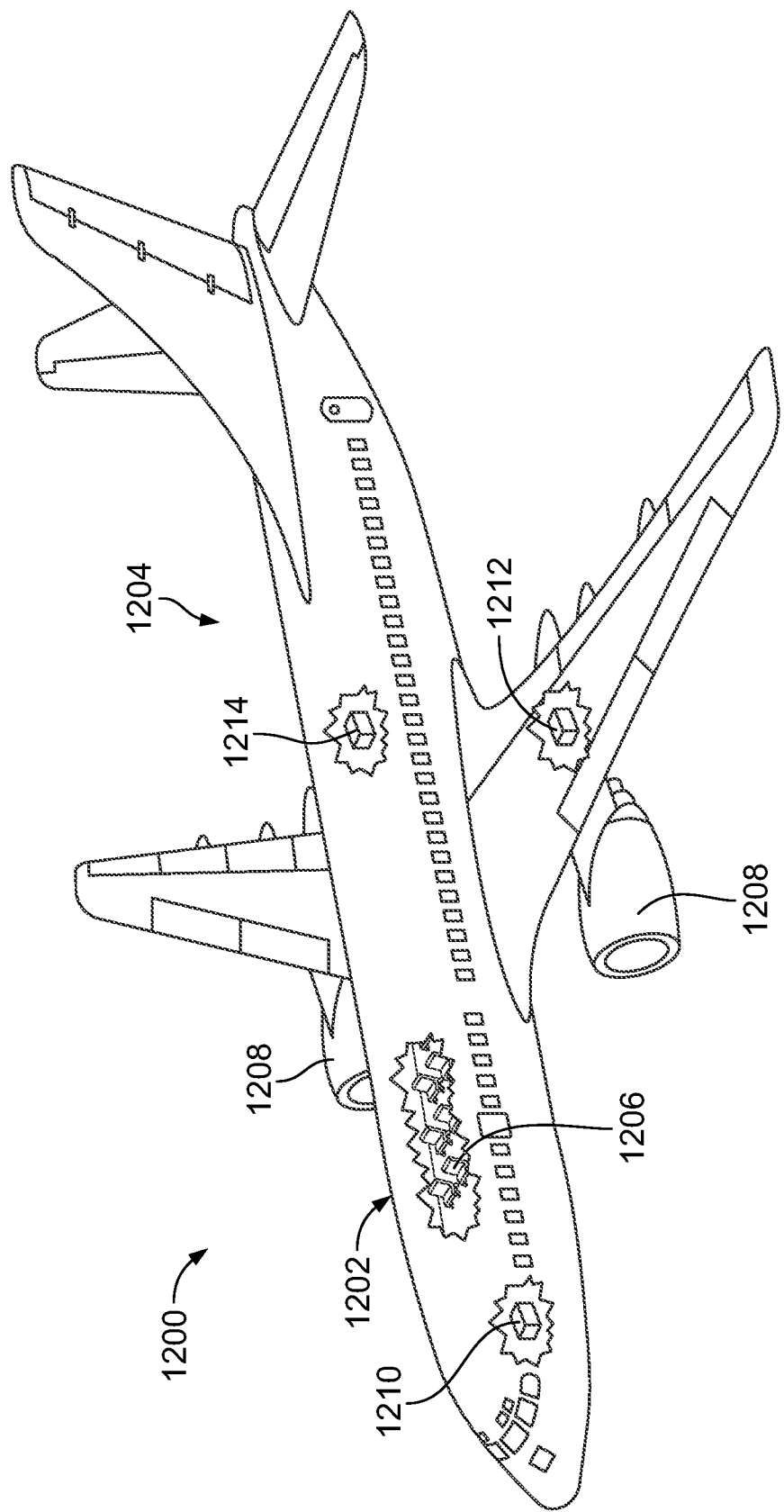
FIG. 12 is a schematic perspective view of an aircraft.

Examples of the disclosure may be described in the context of an aircraft manufacturing and service method 1100 as shown in FIG. 11 and an aircraft 1200 as shown in FIG. 12. During pre-production, illustrative method 1100 may include specification and design 1102 of the aircraft 1200 and material procurement 1104. During production, component and subassembly manufacturing 1106 and system integration 1108 of the aircraft 1200 take place. Thereafter, the aircraft 1200 may go through certification and delivery 1110 to be placed in service 1112. While in service by a customer, the aircraft 1200 is scheduled for routine maintenance and service 1114 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, the aircraft 1200 produced by the illustrative method 1100 may include an airframe 1202 with a plurality of high-level systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles of the invention may be applied to other industries, such as the automotive industry. Accordingly, in addition to aircraft 1200, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1106 may be fabricated or manufactured in a manner similar to components or subassemblies produced while the aircraft 1200 is in service. Also, one or more aspects of the apparatus, method, or combination thereof may be utilized during the production stages 1106 and 1108, for example, by substantially expediting assembly of or reducing the cost of an aircraft 1200. Similarly, one or more aspects of the apparatus or method realizations, or a combination thereof, may be utilized, for example and without limitation, while the aircraft 1200 is in service, e.g., maintenance and service 1114.

While various spatial and directional terms, such as top, bottom, upper, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A storage bin assembly comprising:
    a fixed bin portion configured to be mounted to an aircraft, the fixed bin portion having a cavity configured for storage of luggage;
    a door coupled to the fixed bin portion and movable between an open position and a closed position;
    an articulating bin portion coupled to the fixed bin portion, the articulating bin portion comprising a shelf configured for supporting luggage; and
    an articulation system movably coupling the articulating bin portion to the fixed bin portion, wherein the articulating bin portion is movable from a first position in which the articulating bin portion is proximate to the fixed bin portion to a second position at which the articulating bin portion is separated from the fixed bin portion and lower than the fixed bin portion, and wherein the door is moveable between the open position and the closed position independent from the position of the articulating bin portion.

2. The storage bin assembly of claim 1, wherein the articulating bin portion is moveable from the first position to the second position when the door is in the open position but not in the closed position.

3. The storage bin assembly of claim 1, further comprising a biasing member interposed between the fixed bin portion and the articulating bin portion, the biasing member configured to urge the articulating bin portion toward the first position.

4. The storage bin assembly of claim 3, wherein the biasing member comprises a spring.

5. The storage bin assembly of claim 1, wherein
    the fixed bin portion includes a fixed base configured to support the articulating bin portion when the articulating bin portion is in the first position;
    the articulating bin portion includes an articulating base that is configured to be disposed above the fixed base when the articulating bin portion is in the first position; and
    the articulation system comprises links coupled to each other such that the articulating bin portion moves downward and laterally away from the fixed bin portion when moving from the first position to the second position.

6. The storage bin assembly of claim 5, wherein the links of the articulation system comprise a first link and a second link, wherein the first link has a first end pivotally coupled to the fixed bin portion, and a second end pivotally coupled to the second link, wherein the second link has a first end pivotally coupled to the second end of the first link, and a second end pivotally coupled to the articulating bin portion, wherein the first and second link define an included angle, wherein the included angle is smaller for the first position than the second position.

7. The storage bin assembly of claim 6, further comprising a spring and damper assembly having a first end configured to couple to a fixed location and a second end coupled to the second end of the first link and the first end of the second link.

8. The storage bin assembly of claim 6, further comprising a stop pin disposed on the articulating bin portion and configured to inhibit rotation of the articulating bin portion with respect to the second link.

9. A storage bin assembly comprising:
    a fixed bin portion configured to be mounted to an aircraft, the fixed bin portion having a cavity configured for storage of luggage, the fixed bin portion comprising a fixed base configured to support an articulating bin portion when the articulating bin portion is in a first position;
    a door coupled to the fixed bin portion and movable between an open position and a closed position;

the articulating bin portion coupled to the fixed bin portion, the articulating bin portion comprising a shelf configured for supporting luggage, the articulating bin portion comprising an articulating base that is configured to be disposed above the fixed base when the articulating bin portion is in the first position; and an articulation system movably coupling the articulating bin portion to the fixed bin portion, wherein the articulating bin portion is movable from the first position in which the articulating bin portion is proximate to the fixed bin portion to a second position at which the articulating bin portion is separated from the fixed bin portion and lower than the fixed bin portion, the articulation system including links coupled to each other such that the articulating bin portion moves downward and laterally away from the fixed bin portion when moving from the first position to the second position, and wherein the door is moveable between the open position and the closed position independent from the position of the articulating bin portion.

10. The storage bin assembly of claim 9, wherein the links of the articulation system comprise a first link and a second link, wherein the first link has a first end pivotally coupled to the fixed bin portion, and a second end pivotally coupled to the second link, wherein the second link has a first end pivotally coupled to the second end of the first link, and a second end pivotally coupled to the articulating bin portion, wherein the first and second link define an included angle, wherein the included angle is smaller for the first position than the second position.

11. The storage bin assembly of claim 10, further comprising a spring and damper assembly having a first end configured to couple to a fixed location and a second end coupled to the second end of the first link and the first end of the second link.

12. The storage bin assembly of claim 10, further comprising a stop pin disposed on the articulating bin portion and configured to inhibit rotation of the articulating bin portion with respect to the second link.

* * * * *